United States Patent [19]

Ekuan

[11] Patent Number: 4,546,898

[45] Date of Patent: Oct. 15, 1985

[54] BOX

[75] Inventor: Kenji Ekuan, Tokyo, Japan

[73] Assignee: C. I. Kasei Co., Ltd., Tokyo, Japan

[21] Appl. No.: 569,707

[22] Filed: Jan. 10, 1984

[30] Foreign Application Priority Data

Jan. 11, 1983 [JP] Japan ............................. 58-1288[U]
May 20, 1983 [JP] Japan ............................ 58-74487[U]

[51] Int. Cl.⁴ ............................................ B65D 51/04
[52] U.S. Cl. ....................................... 220/337; 16/363;
16/365; 150/52 J; 206/425; 206/444; 220/334
[58] Field of Search .......................... 16/361, 363–365,
16/374; 150/52 J; 206/44 B, 309, 255, 311–313,
265, 425, 444, 45.13; 360/133; 220/263, 264,
334, 337, 342

[56] References Cited

U.S. PATENT DOCUMENTS

| | | | |
|---|---|---|---|
| 1,997,043 | 4/1935 | Clark | 220/333 |
| 2,150,817 | 3/1939 | Boex | 220/334 |
| 2,201,547 | 5/1940 | Scheinman | 206/425 |
| 2,356,179 | 8/1944 | Proudman et al. | 220/334 |
| 2,375,645 | 5/1945 | Gordon | 220/337 |
| 2,718,833 | 9/1955 | Roth | 150/52 J |
| 4,325,595 | 4/1982 | Solomon | 206/45.13 |

FOREIGN PATENT DOCUMENTS

| | | | |
|---|---|---|---|
| 0880998 | 5/1953 | Fed. Rep. of Germany | 150/52 J |
| 2905704 | 8/1980 | Fed. Rep. of Germany | 206/425 |
| 6505012 | 4/1966 | Netherlands | 220/334 |
| 0155548 | 1/1921 | United Kingdom | 220/334 |

*Primary Examiner*—William T. Dixson, Jr.
*Assistant Examiner*—Jimmy G. Foster
*Attorney, Agent, or Firm*—Sughrue, Mion, Zinn, Macpeak, and Seas

[57] ABSTRACT

A box, such as may be used to store audio disks computer floppy disks or the like, in which the box opens up into a fan-like shape so that the articles stored therein can readily be identified. A box body is constituted by a back plate, a bottom plate and a left and a right side plate. A front plate section, constituted by a front plate, is pivoted at its lower end on the bottom plate. Left and right wing plates, which extend from the respective opposite sides of the front plate, contact the left and right side plates. A cover plate is formed by a top plate having a collar extending therefrom with the cover section being swingably pivoted on the box body.

4 Claims, 22 Drawing Figures

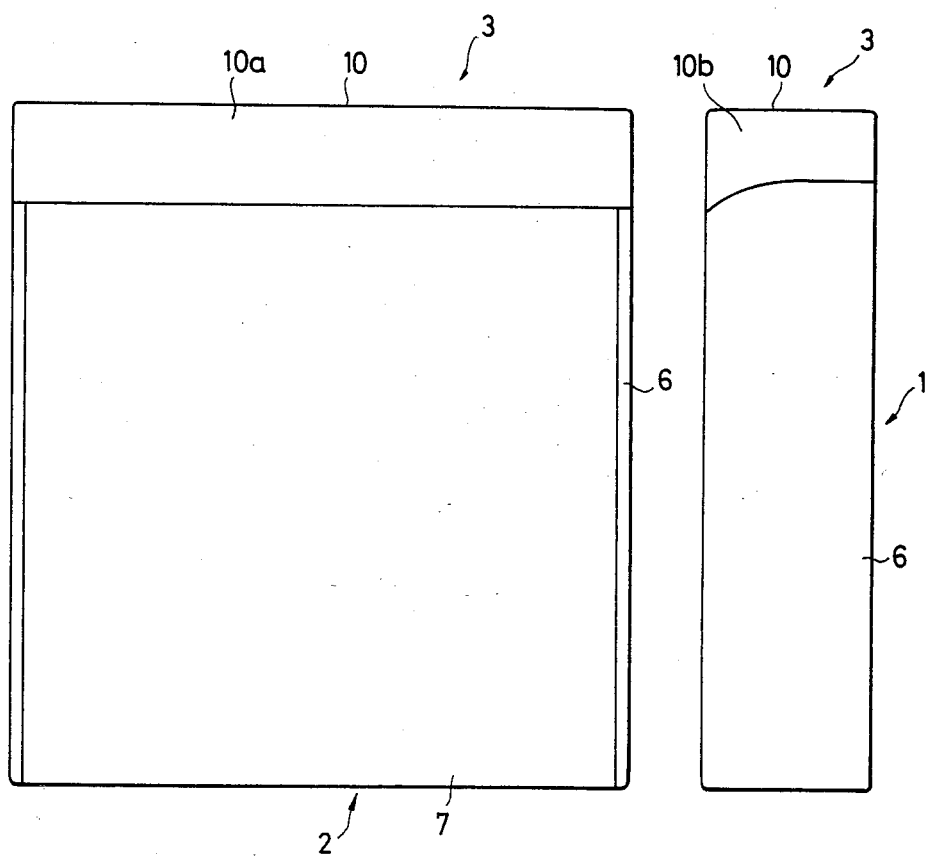

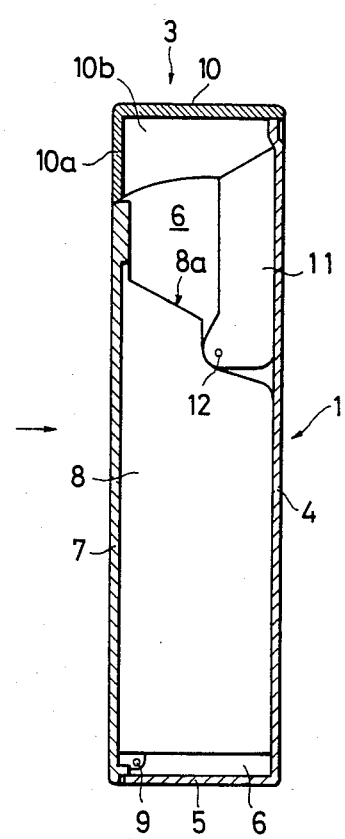
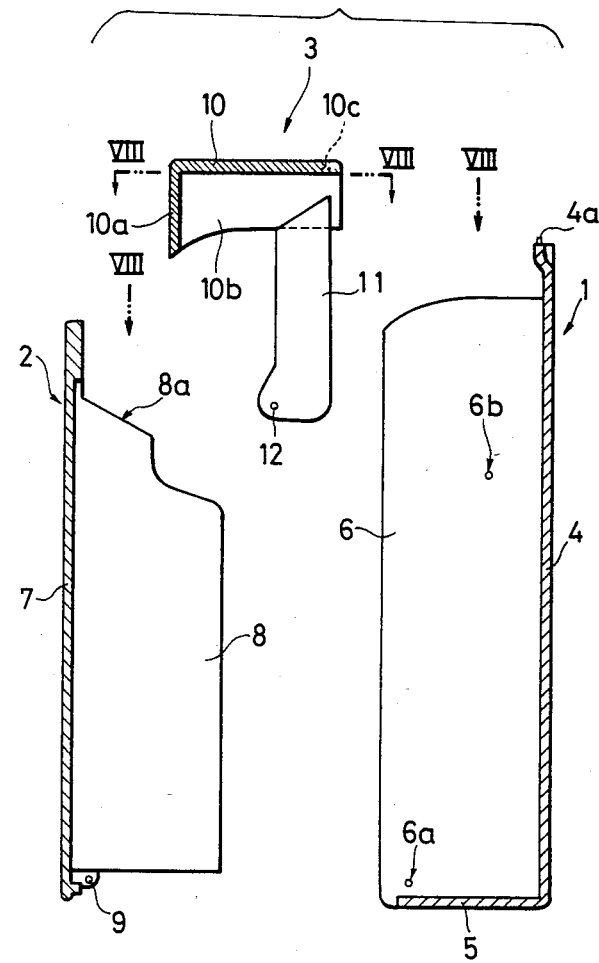
FIG. 6
FIG. 7

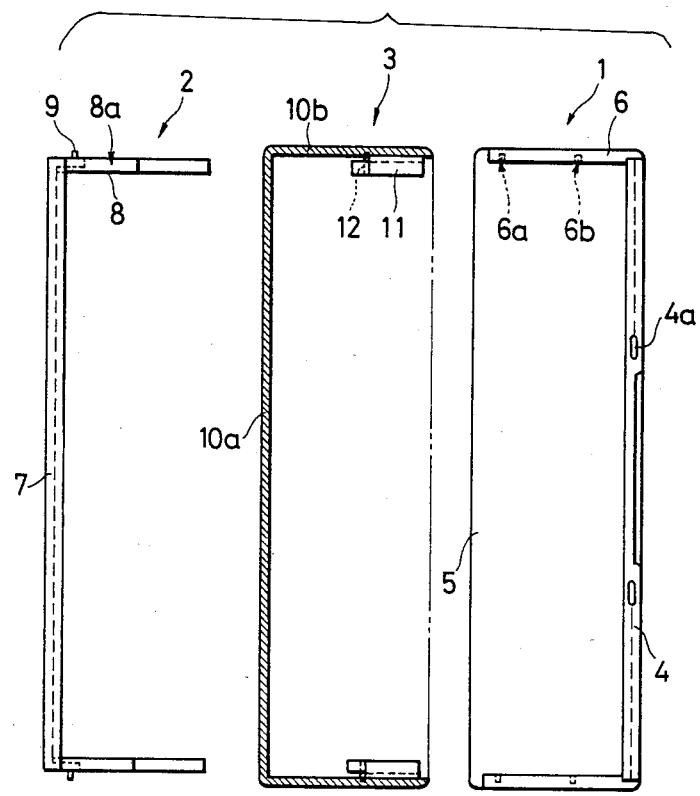

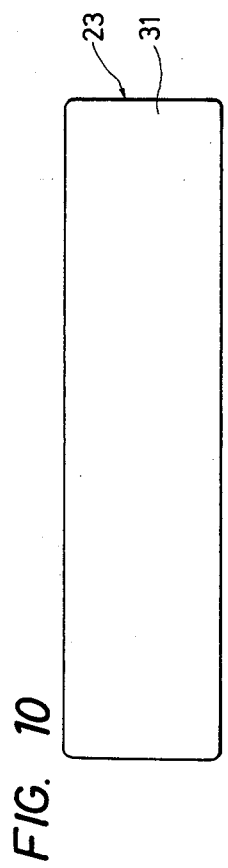
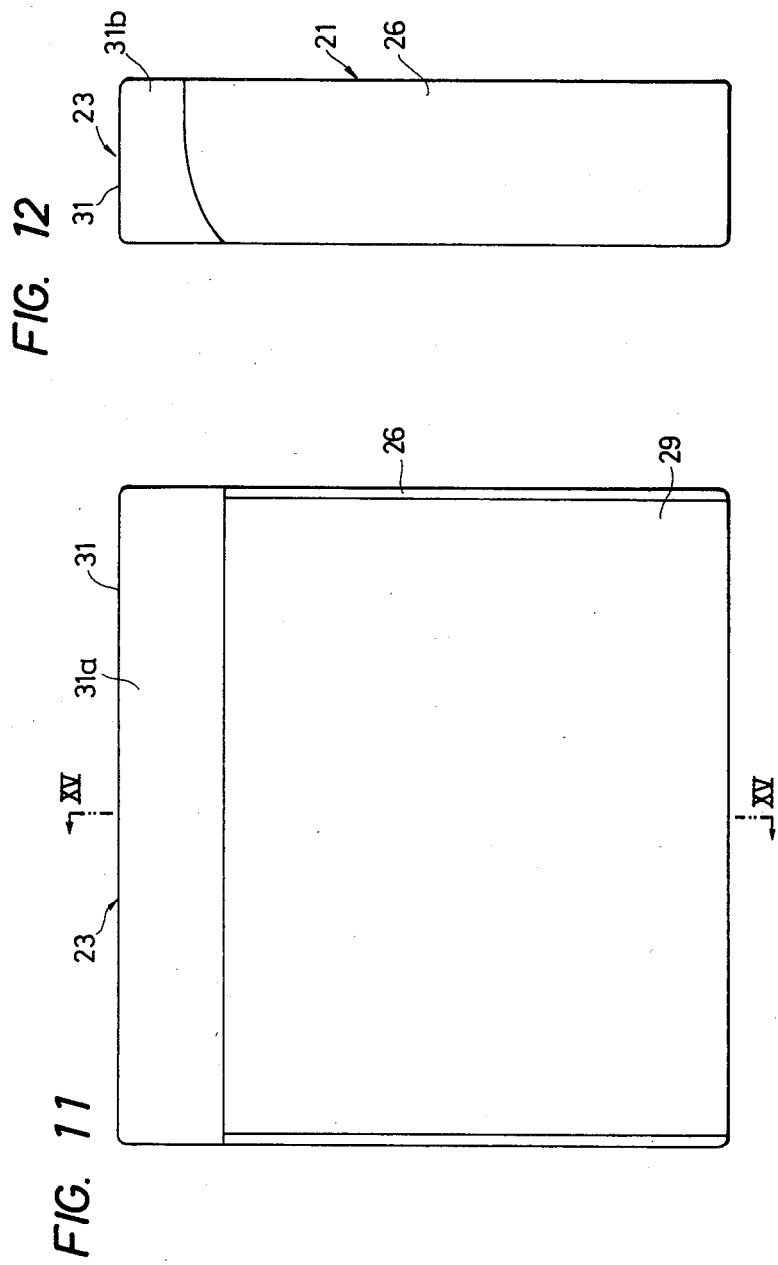
FIG. 10
FIG. 11
FIG. 12

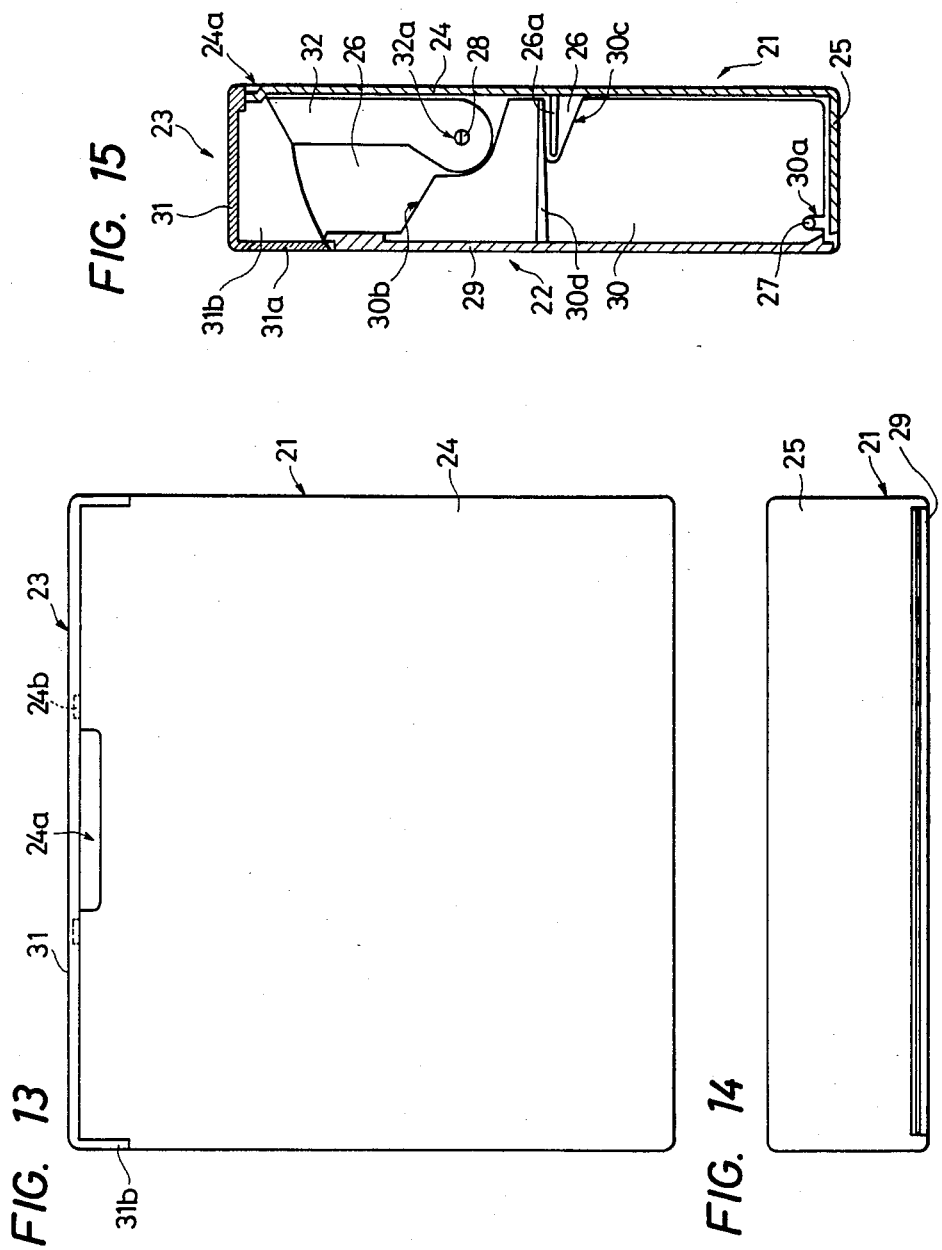

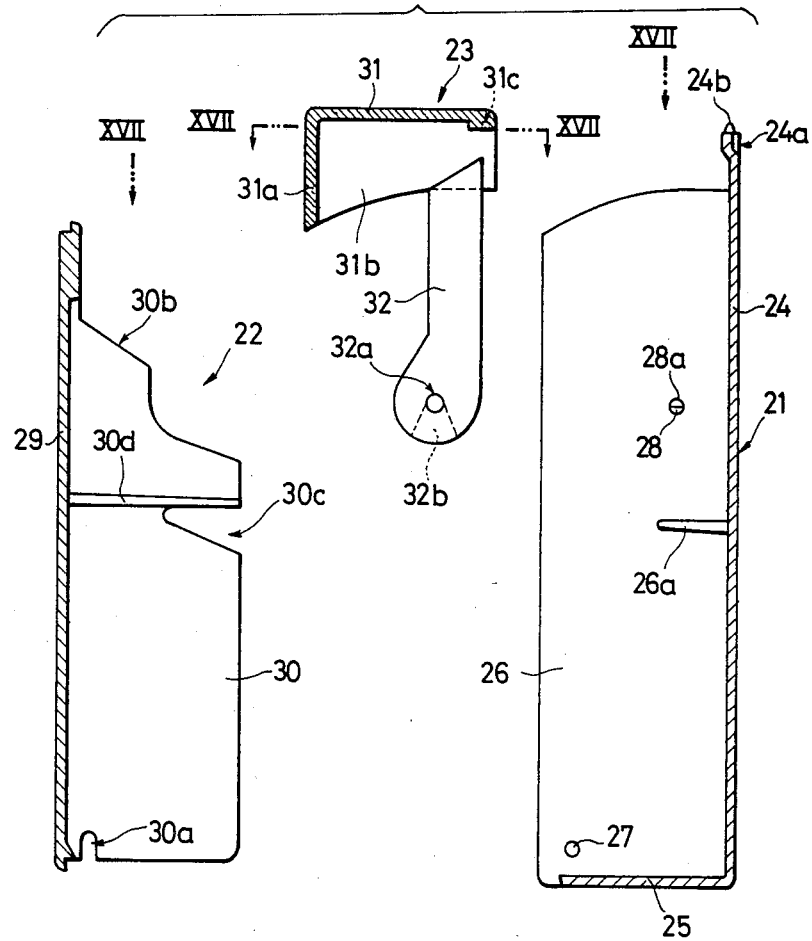

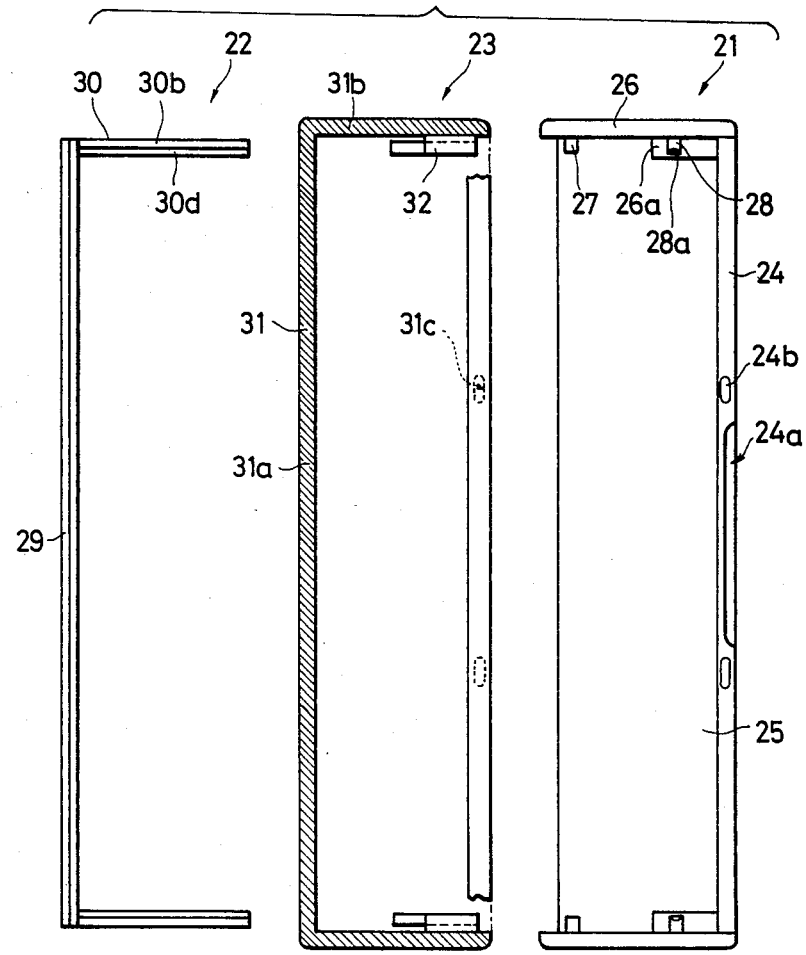

BOX

BACKGROUND OF THE INVENTION

The present invention relates to a box used for holding computer floppy disks or the like, and particularly to an opening/closing mechanism of such a box.

In many cases a thin box, provided at an end surface with an openable/closable cover, is used for storing stacked card-like or disk-like articles such as floppy disks or audio disks. Since such a conventional box is constituted by integrally fixed plates, the area of the opening at the cover is so narrow that there is a drawback in that articles can not easily be put into and taken out of the box, and it is difficult to selectively distinguish among articles in the box without taking them out of the box.

The present invention is intended to eliminate the drawback mentioned above. An object of the present invention is thus to provide a thin box in which the width of an opening at an end face of the box is widened when articles are being put into or taken out of the box.

SUMMARY OF THE INVENTION

To attain the above-mentioned object, the box according to the present invention is characterized in that by a box body integrally constituted by a back plate, a bottom plate and a left and a right side plate, a front plate section constituted by a front plate pivoted at its lower end onto the bottom plate, and a left and a right wing plate which extend from the opposite sides of the front plate and the left and right side plates, and a cover section constituted by a top plate provided with a collar extending therefrom. The cover section is swingably pivoted onto the box body such that the cover section is caused, in its closed position in which it covers the upper face of the box body, to engage the upper edge of the front plate section placed in its closed position.

BRIEF DESCRIPTION OF THE DRAWINGS

FIG. 1 is a front view of a box according to a first embodiment of the present invention;

FIG. 2 is a side view of the same box;

FIG. 6 is a side cross-sectional view of the same box;

FIG. 7 is a view of the box of FIG. 6 with parts illustrated separately;

FIG. 8 is a plan view along a line VIII—VIII and in a direction indicated in FIG. 7;

FIG. 10 is a top view of a box according to a second embodiment of the present invention;

FIG. 11 is a front view of the same box;

FIG. 12 is a side view of the same box;

FIG. 13 is a rear view of the same box;

FIG. 14 is a bottom view of the same box;

FIG. 15 is a side cross-section view along a line VI—VI in FIG. 11;

FIG. 16 is a view of the box of FIG. 15 with parts illustrated separately;

FIG. 17 is a series of plan and cross-sectional views taken along line VIII—VIII or in the direction of arrows VIII shown in FIG. 16;

DESCRIPTION OF THE PREFERRED EMBODIMENTS

Figure 3:
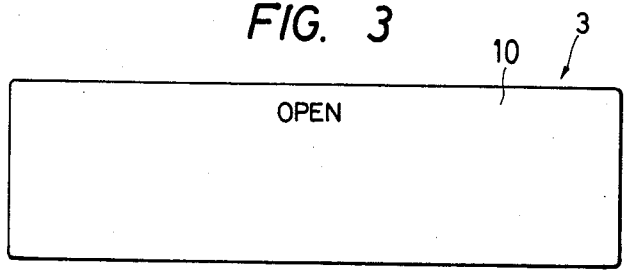
FIG. 3 is a top view of the same box.
Figure 4:
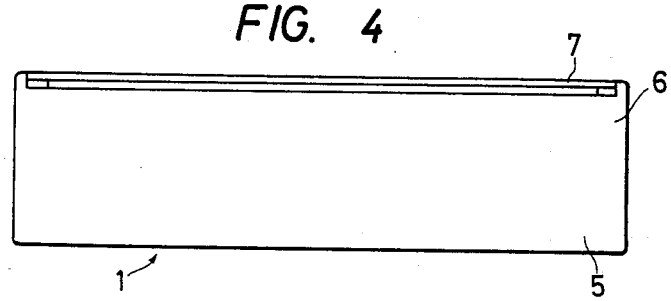
FIG. 4 is a bottom view of the same box.
Figure 5:
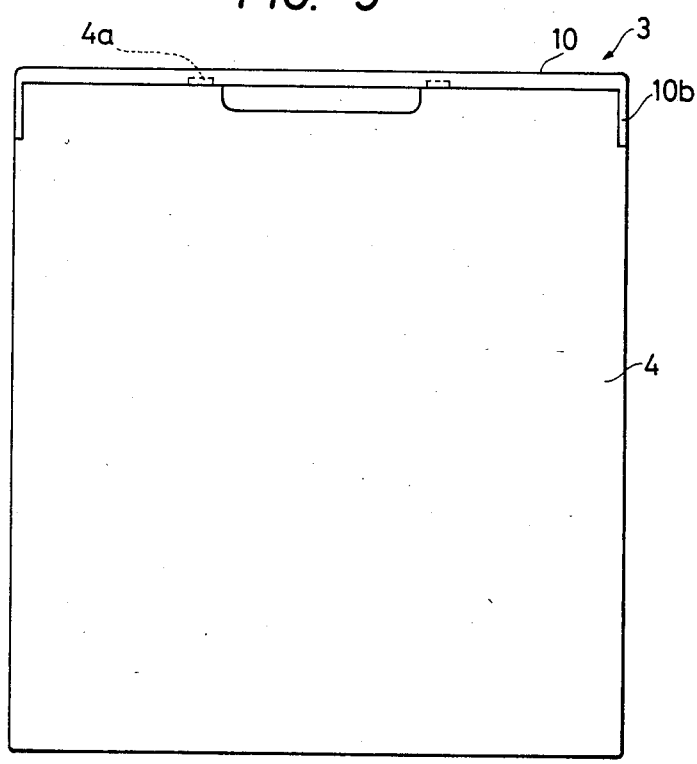
FIG. 5 is a rear view of the same box.

The present invention will be explained on the basis of two embodiments thereof. Referring to FIGS. 1 to 9(b), a box according to a first embodiment will be described.

This box is thin and has an openable/closable upper end and a substantially square front face. The box is constituted by a box body 1, a front plate section 2 and a cover section 3. The constituent features of the box body 1, the front plate section 2 and the cover section 3 will be described hereunder.

BOX BODY 1

The box body 1 is integrally constituted by a back plate 4, a bottom plate 5, and left and right side plates 6. Shaft receiving holes 6a are formed at the respective forward lower portions in the left and right side plates 6 for pivotally supporting thereat the front plate section 2. Other shaft receiving holes 6b are formed at the respective backward intermediate height portions in the same left and right side plates 6 for pivotally supporting thereat the cover section 3. Two click operation protrusions 4a are formed at respective left and right portions on the upper end surface of the back plate 4.

FRONT PLATE SECTION 2

The front plate section 2 is integrally constituted by a front plate 7 and wing plates 8 which extend backward from the left and right side ends, respectively, of the front plate 7 so as to be in sliding contact with the left and right side plates 6. Outwardly projecting shaft pins 9 are formed at the lower corner portions on the respective wing plates 8 which are inserted into the shaft receiving holes 6a respectively. Slanted end surfaces 8a are formed at the forward portions of the upper end surfaces of the respective wing plates 8.

COVER SECTION 3

The cover section 3 is integrally constituted by a top plate 10, a front collar 10a, side collars 10b each of which is cut off at its lower end to form a curved end surface, and arms 11 extending downwardly with respect to the back ends of the side collars 10b. Outwardly projecting shaft pins 12 are formed at the lower ends of the arms 11 and are inserted into the shaft receiving holes 6b formed at the intermediate height of the respective side plates 6.

Two click grooves 10c are respectively formed at the left and right portions on the back end of the top plate 10 where the click protrusions 4a can be inserted.

In the state as shown in FIGS. 1 to 6 in which the box body 1, the front plate section 2 and the cover section 3 are assembled, the rear end of the top plate 10 abuts on the upper end of the back plate 4, the respective lower ends of the side collars 10b abut on the upper ends of the side plates 6, and the lower end of the front collar 10a abuts the upper end of the front plate 7; thus, the upper end of the box is closed by the cover section 3. Further, in this state, the click protrusions 4a of the back plate 4 are inserted into the click grooves 10c of the top plate 10 so that the cover section 3 is locked onto the back plate 4 by the elastic force of the cover section 3 and hence is prevented from swinging open, and the front plate section 2 is sandwiched between the inner surface of the back plate 4 and the lower end of the front collar 10a of the cover section 3 so that the box structure is made sturdy.

Figure 9A:
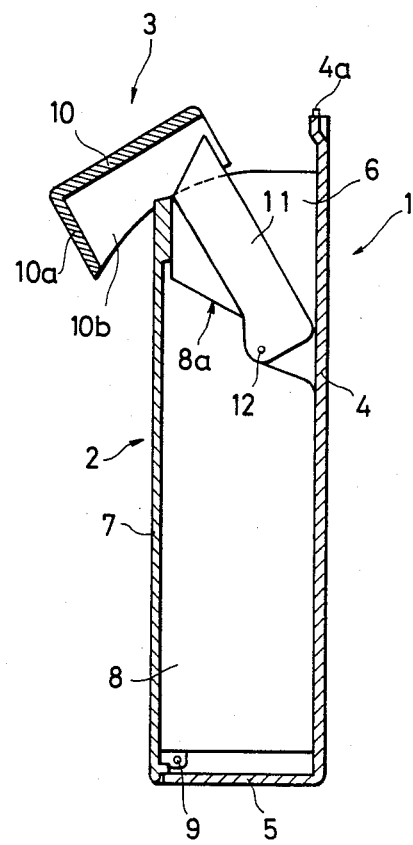
FIGS. 9(a) and 9(b) are operational diagrams of the box of FIG. 6.
Figure 9B:
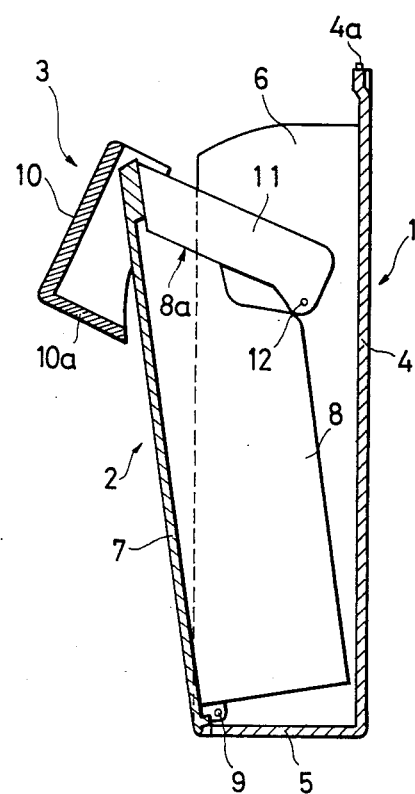
Figure 18:
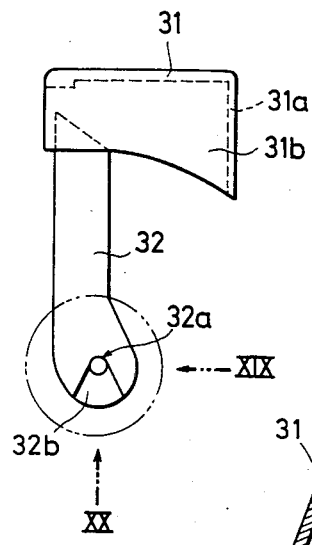
FIG. 18 is an external view of a cover section in FIG. 16.

The thus arranged box according to the first embodiment may be opened merely by pushing forward the rear end of the top plate 10. The click engagement between the click protrusions 4a and the click grooves 10c of the top plate 10 is released against the elastic force so that the cover section 3 comes down forwardly into a half-opened position first, as shown in FIG. 9(a), in which the forward edges of the arms 11 strike the upper end of the front plate 7. If the cover section 3 is further moved forwardly, it will simultaneously cause the front plate 7 to pivot forwardly due to contact with the upper end of the arms 11. The cover section 3 finally reaches its fully opened position, as shown in FIG. 9(b), in which the respective forward edges of the arms 11 touch the respective slanted end surfaces of the wing plates 8 and the front plate 7 is opened into a fan shape.

The box may be closed by righting the cover section 3 until the top plate 10 is click engaged with the back plate 4 through the click protrusions 4a and the click grooves 10c.

Referring to FIGS. 10 to 21, a box according to a second embodiment will be next described.

Similarly to the above-mentioned arrangement of the first embodiment, the box of this embodiment is constituted by a box body 21, a front plate section 22, and a cover section 23. The constituent features of the box body 21, the front plate section 22 and the cover section 23 will be described hereunder.

BOX BODY 21

The box body 21 is integrally constituted by a back plate 24, a bottom plate 25, and left and right side plates 26. Outward projecting shaft pins 27 for pivotally supporting the front plate section 22 are formed at the forward lower corners of the side plates 26, and projecting shaft pins 28 for pivotally supporting the cover section 23 are formed at the portions near the backward intermediate height portions of the side plates. Further, detachment-preventing ribs 26a are formed horizontally at backward intermediate height portions of the side plates. A tapered surface 28a is provided on the upper half of the tip of the shaft pin 28. Holding groove 24a is formed at the upper central portion of the outer surface of the back plate 24, and two click protrusions 24b are respectively formed at left and right portions on the upper end surface of the back plate 24.

FRONT PLATE SECTION 22

The front plate section 22 is integrally constituted by a front plate 29 and wing plates 30 which extend backwardly from the left and right side ends of the front plate 29 and are in sliding contact with the left and right side plates 26. Shaft receiving grooves 30a for receiving the shaft pins 27 are formed at the portions near the forward lower ends of the wing plates 30. Slanted end surfaces 30b are formed at the portions near the forward portions of the upper ends of the wing plates 30. V-shaped cuts 30c for receiving the detachment preventing rib 26a are formed at the backward upper portions of the wing plates. Supporting ribs 30d are formed along the upper flanges of the cuts 30c.

COVER SECTION 23

Figure 19:
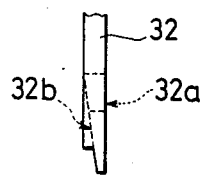
FIGS. 19 and 20 are a front view and a bottom view in the directions of arrows X and XI in FIG. 18, respectively.
Figure 20:
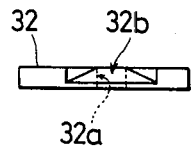

The cover section 23 is integrally constituted by top plate 31 which includes a front collar 31a, side collars 31b, and right and left arm plates 32 which extend downward from the respective back ends of the side collars 31b. Click grooves 31c are formed at the back end of the top plate 31 in which the click protrusions 24b can be received. Shaft receiving holes for receiving the shaft pins 8 are formed at the lower parts of the arm plates 32. Slanted and cut surfaces 32b are formed on the outer surfaces of the arms below the shaft receiving holes 32a. The surfaces 32b are formed with a sector shape and slant inwardly as shown in FIGS. 19 and 20.

For assembly, when the front plate section 22 is fitted into the box body 21, the shaft receiving grooves 30a of the wing plates 30 are positioned just over the shaft pins 27 of the side plates 26. The front plate comes down forwardly so that the rear ends of the wing plates 30 do not abut the detachment preventing ribs 26a of the box body 21. Then, the front plate section 22 is pushed downwardly. The shaft pins 27 are easily inserted into the upper parts of the shaft receiving grooves 30a, and the front plate 22 is locked onto the box body 21. Afterward, the front plate 22 is raised.

When the cover section 23 is fitted into the box body 21, the lower ends of the arm plates 32 are positioned just over the shaft pins 28 of the side plates 26. Then, the cover section 23 is pushed down. Since the slanted and cut surface 32b on the lower ends of the arm plates 32 slides on the tapered surfaces 28a of the tips of the shaft pins 28, the lower parts of the arm plates 32 are bent inward and the cover section 23 is easily moved downward. When the shaft receiving holes 32a are moved to the shaft pins 28, the shaft pins 28 are inserted into the shaft receiving holes 32a. The arm plates 32 are then back in their free state, and the cover section 23 is locked onto the box body 21.

In the state in which the front plate section 22, the cover section 23 and the box body 21 are assembled with each other, the click protrusions 24a are inserted into the click grooves 31c and the upper end of the front plate 29 is locked by the lower part of the front collar 31a of the cover section, so that the box structure is tight and is prevented from being rickety.

Figure 21:
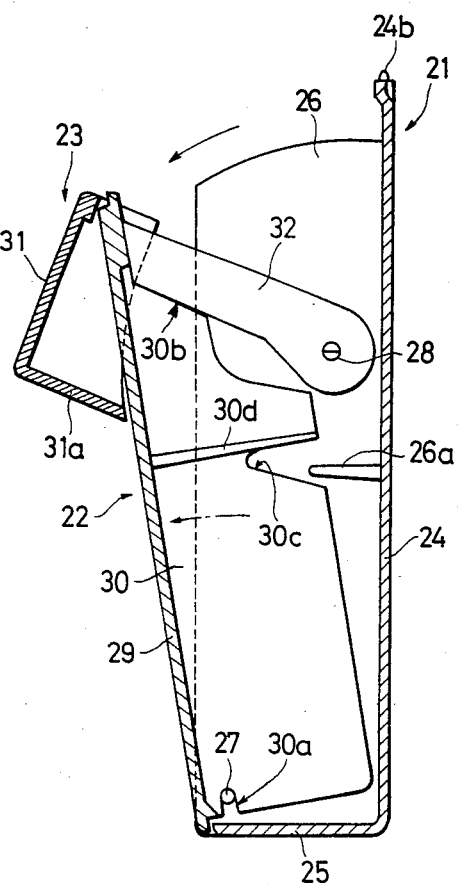
FIG. 21 is an operational diagram of the box of FIG. 15.

The thusly constructed box according to the second embodiment may be opened merely by pushing forward the rear end of the top plate 31. The click engagement between the click protrusions 24a and the click grooves 31c of the top plate 31 is released so that the cover section 23 and the front plate section 22 come down forwardly about the shaft pins 28 and 27, respectively. As shown in FIG. 21, forward edges of the arm plates 32 strike the slanted end surfaces 30b of the wing plate 30 and the upper portion of the box is opened widely. Therefore, filling and retrieval of articles can be easily performed.

The box may be closed by an operation reverse to the opening operation as described above.

As described above, in the box according to the second embodiment, the front plate section 22 and the cover section 23 are fitted with ease and without excess force. Thus, the box body 21, the front plate section 22 and the cover section 23 are not in danger of breaking. Further, since the wing plates 30 are supported with the ribs 30d, the box is strong.

As described above, the box according to each of the embodiments of the present invention can be opened widely so that articles can be easily put into and taken out of the box, and the articles contained in the box can be easily distinguished.

As described above, the box according to the present invention is arranged such that the front plate section can be caused to open forwardly with respect to the box body and the front plate section can be put in its opened position and can be held in its closed position by the cover section which can swing to its closed/opened positions. Thus, the filling and extraction of articles and the selection among articles in the box can be easily performed.

I claim:

1. A box, comprising: a box body comprising a back plate, a bottom plate and a left and a right side plate; a front plate section comprising a forwardly openable front plate and a left and a right wing plate which extend from respective opposite sides of said front plate and contact said left and right side plates, respectively; means for pivotably supporting said front plate at its lower end; a cover section comprising a top plate provided with a collar extending therefrom and left and right downwardly extending arms; and means for swingably pivoting said cover section on said box body via said arms such that said cover section is movable between a first position wherein said collar abuts said front plate and said back plate is releasibly engaged with said top plate, and a second position in which said cover section lies substantially forwardly of said front plate, with said arms in contact with said wings and said front plate.

2. The box according to claim 1, further including pivot means for pivoting said arms on said side plates of said box body at the opposite sides of said cover section.

3. The box according to claim 1, further including pivot means for pivoting said arms on said side plates of said box body at portions of said side plates near the upper end of said back plate.

4. The box according to claim 1, further comprising: a first shaft pin provided on an inner surface of each said side plate, a groove provided at a position near an end of said each wing plate, a lower end of each arm being received within an upper part of said groove, a shaft receiving hole being provided on a lower part of said arm, and a slanted and cut surface being provided on said each arm above said each shaft receiving hole; and a second shaft pin provided on an inner surface of each said side plate, said second pin being inserted into shaft receiving means of said wing plates to enable said front plate to pivot forwardly for opening.

* * * * *